United States Patent
Yamashita et al.

(10) Patent No.: US 8,222,173 B2
(45) Date of Patent: Jul. 17, 2012

(54) CATALYST AND METHOD OF MANUFACTURING THE SAME

(75) Inventors: Hiromi Yamashita, Suita (JP); Tadahiro Kaminade, Yokohama (JP)

(73) Assignees: Nippon Oil Corporation, Minato-ku, Tokyo (JP); Osaka University, Suita-shi, Osaka (JP)

( * ) Notice: Subject to any disclaimer, the term of this patent is extended or adjusted under 35 U.S.C. 154(b) by 0 days.

(21) Appl. No.: 11/992,830

(22) PCT Filed: Mar. 27, 2006

(86) PCT No.: PCT/JP2006/306100
§ 371 (c)(1),
(2), (4) Date: Apr. 8, 2008

(87) PCT Pub. No.: WO2007/037026
PCT Pub. Date: Apr. 5, 2007

(65) Prior Publication Data
US 2009/0118116 A1 May 7, 2009

(30) Foreign Application Priority Data
Sep. 28, 2005 (JP) .................................. 2005-281579

(51) Int. Cl.
*B01J 37/34* (2006.01)
*B01J 21/06* (2006.01)

(52) U.S. Cl. ............ 502/5; 502/240; 502/242; 502/243; 502/244; 502/245; 502/258; 502/259; 502/260; 502/261; 502/262

(58) Field of Classification Search ............... 502/5, 240, 502/242, 243, 244, 245, 258, 259, 260, 261, 502/262
See application file for complete search history.

(56) References Cited

U.S. PATENT DOCUMENTS

| | | | |
|---|---|---|---|
| 6,255,499 B1 * | 7/2001 | Kuperman et al. | 549/523 |
| 2004/0176620 A1 * | 9/2004 | Kuperman et al. | 549/533 |
| 2006/0182997 A1 * | 8/2006 | Yamamoto et al. | 428/692.1 |

FOREIGN PATENT DOCUMENTS

| | | |
|---|---|---|
| JP | 2001246230 A | 9/2001 |
| JP | 2004290728 A | 10/2004 |

OTHER PUBLICATIONS

Shimizu et al., "Hikari sekishutsuho ni yoru Ti Ganyu Mesoporous Silica Saikonai de noPt Cho Biryushi no Chosei," Sekiyu Gakkai Dai 48, *Kai Nenkai Koen Yoshi*, p. 123, May 16, 2005.

Shimizu et al., "Ti Ganyu Mesoporous Silica ni Tanji shita Pt Cho Biryushi no Shokubai Tokusei," Nihon Kinzoku Gakkai Koen Gaiyo 2005 Nen Shunki (Dai 136 Kai) Taikai, Mar. 29, 2005, p. 454.

Yamashita et al., "Hikari sekishutsuho ni yoru cr koteika ti ganyu mesoporous takoshitsu silica hikari shokubai no chosei to kashi hikari shoshaka deno sentaku sanka hanno," Dai 92, *Kai Shokubai Toronkai Toronkai*, p. 278, Sep. 18, 2003.

Masui et al., "Hikari sekishutsuho ni yori sanka chromium o tanji shita kashi hikari otogata hikari shokubai no chosei," Dai 26 Kai Shokubai no chosei, Dai 96, *Kai Shokubai Toronkai Toronkai A Yokoshu*, p. 88, Sep. 20, 2005.

Zheng et al., Synthesis, characterization and photoactivity of nanosized palladium clusters deposited on titania-modified mesoporous MCM-41, *Journal of Solid State Chemistry*, 2001, pp. 138-141vol. 162.

Hu et al., "Characterizatio of photocatalyutic activity of noble-metal-supported surface TiO2/SiO2," *Applied Catalysts A: General*, Oct. 28, 2003, pp. 389-396, vol. 253, No. 2.

Zheng et al., "Synthesis, characterization and photocatalytic properties of titania-modified mesoporous silicate." J. Material Chem. Jan. 7, 2000, pp. 723-727.

* cited by examiner

*Primary Examiner* — Elizabeth Wood
(74) *Attorney, Agent, or Firm* — Fitch, Even, Tabin & Flannery LLP

(57) ABSTRACT

A method of manufacturing a catalyst by suspending a titanium-containing silicate porous material in a solution with a metal salt being dissolved therein, and then by exposing the solution to ultra violet light to precipitate metal fine particles on the surface of the porous material.

7 Claims, 2 Drawing Sheets

CATALYST AND METHOD OF MANUFACTURING THE SAME

CROSS-REFERENCE TO RELATED APPLICATION

This is a U.S. National Phase of International Application PCT/JP2006/306100, filed Mar. 27, 2006, in which a Demand, Argument, and Amendment under Article 34 were filed on Jul. 27, 2007, and which claims the benefit of foreign priority under 35 U.S.C. §119 based on JP 2005-281579, filed Sep. 28, 2005, the entire disclosures of which applications and Article 34 Amendment are hereby incorporated herein by reference.

TECHNICAL FIELD

The present invention relates to a method of manufacturing a catalyst that includes a titanium-containing silicate porous material serving as a support, and also relates to a catalyst manufactured by the method.

BACKGROUND OF THE INVENTION

Conventionally, catalysts in each of which an active metal is supported by a catalyst support having a large specific surface area have been widely used for industrial purposes. Some already known examples of the method of making an active metal be supported by a catalyst support are what are termed impregnation methods, such as the evaporation-to-dryness method, the equilibrium adsorption method, and the pore-filling method, as well as the ion-exchange method. In the evaporation-to-dryness method, a support is firstly immersed in a metal-containing solution and then the solvent is evaporated to make the active metal be supported by the support. The evaporation-to-dryness method tends to cause agglomeration of the active metal, and leads to a relatively low dispersivity of the active metal. Consequently, the evaporation-to-dryness method has its own limits in enhancing the catalyst activity. In the equilibrium adsorption method, firstly, the support is immersed in a metal-containing solution, and then the excess solution is removed by filtration or the like to make only the active metal that is adsorbed to the support be supported by the support. The equilibrium adsorption method is capable of enhancing the degree of dispersivity of the active metal in comparison to the evaporation-to-dryness method. However, when the product catalyst is examined portion by portion, there exist portions where the active metal is agglomerated and there also exist other portions where the active metal is dispersed in a relatively uniform state. Accordingly, it is difficult to disperse the active metal uniformly across the entire body of the support, so that the equilibrium adsorption method has also its own limits in enhancing the catalyst activity. In the pore-filling method, a metal-containing solution is applied to the support little by little. When the surface of the support begins to get wet uniformly, the impregnation is finished. The pore-filling method is capable of making the active metal be supported by the support with a relatively favorable dispersivity, but the amount of the supported active metal is relatively small. Consequently, the pore-filling method has also its own limits in enhancing the catalyst activity. In the ion-exchange method, an active metal is made to be supported by the support by use of the ion exchange that takes place between the metal cation contained in the support and the metal cation to be supported. The ion-exchange method tends to be capable of making the active metal be supported by the support in a relatively highly-dispersed state in comparison to the above-described impregnation methods. However, in order to increase the amount of the supported active metal by increasing the exchange rate in a case where the ion-exchange is an equilibrium reaction, the ion-exchange operation needs to be repeated. Accordingly, the ion-exchange method has a problem of complex preparation for the catalyst in comparison to the above-described impregnation methods.

On the other hand, various catalyst supports have been developed thus far. For example, Japanese Unexamined Patent Application Publication No. 11-76820 (Document 1) discloses a catalyst for partially oxidizing carbon hydride, and the catalyst is made by fixing gold fine particles to a titanium-containing silicate porous material. The catalyst described in Document 1, however, is also manufactured by what is termed an impregnation method, and has its own limits in enhancing the catalyst activity.

DISCLOSURE OF THE INVENTION

The present invention was made in view of the problems that the above-mentioned conventional techniques have. The present invention thus aims to provide a method of manufacturing a catalyst that has a sufficiently enhanced catalyst activity. In the method, metal fine particles can be made to be supported on the surface of a titanium-containing silicate porous material in a highly dispersed state with a relatively easy operation. In addition, the present invention also aims to provide a catalyst which is manufactured by such a method and which has a sufficiently enhanced catalyst activity.

The inventors of the present invention have been dedicated to studying day after day to achieve the above-mentioned aims. As a result, the inventors have discovered that the above-mentioned aims can be achieved by making a titanium-containing silicate porous material be suspended in a metal-containing solution and then by exposing the suspended solution to ultraviolet light of a certain wavelength. The inventors have completed the present invention in this way.

The method of manufacturing a catalyst of the present invention is a method in which a titanium-containing silicate porous material is suspended in a solution with a metal salt being dissolved therein, and then the suspended solution is exposed to ultraviolet light to precipitate metal fine particles on the surface of the porous material.

In addition, the catalyst of the present invention is obtained by the above-mentioned method of the present invention, and includes a titanium-containing silicate porous material and metal fine particles precipitated on the surface of the porous material.

It is preferable that the ultraviolet light used in the present invention include a wavelength component in a range from 200 nm to 450 nm.

It is preferable that the metal according to the present invention be at least one metal selected from the group consisting of precious metals, copper, nickel, cobalt, iron, and tungsten. Among these metals, palladium and/or platinum are more preferable.

In addition, it is preferable that the titanium-containing silicate porous material according to the present invention include a silica skeleton with a part of silicon atoms being substituted by titanium atoms. It is also preferable that the titanium-containing silicate porous material be any one of a titanium-containing mesoporous silica and a titanium-containing zeolite with fine pores, each of which has a diameter in a range from 0.5 nm to 50 nm and with a specific surface area of not smaller than 200 m²/g. It is more preferable that, above all, the titanium-containing silicate porous material have an MFI structure.

Incidentally, it has not been necessarily clear how the metal fine particles can be supported on the surface of the titanium-containing silicate porous material in a highly dispersed state and how the catalyst thus obtained can have sufficiently enhanced catalyst activity. The inventors, however, hypothesize the mechanism as follows. When the titanium-containing silicate porous material is suspended in the metal-containing solution and the suspended solution is exposed to ultraviolet light, the metal cation in the solution forms bonds with titanium atoms excited and activated by the exposure to the ultraviolet light. Then, a precipitate of the metal is formed selectively on some portions, in which titanium atoms exist, of the surface of the titanium-containing silicate porous material. Then, the precipitate of the metal thus formed is fixed with the titanium atoms serving as anchors, and, at the same time, the agglomeration of the metal is prevented. Consequently, the metal fine particles are supported on the surface of the titanium-containing silicate porous material in a highly dispersed state. In this way, reaction fields are formed efficiently by the metal fine particles in the catalyst obtained by such a photo-precipitation method of the present invention, so that the sufficient enhancement of the catalyst activity can be achieved. This is the hypothesis of the inventors of the present invention.

According to the present invention, it is possible to provide a method of manufacturing a catalyst that has a sufficiently enhanced catalyst activity, with which method, metal fine particles can be made to be supported on the surface of a titanium-containing silicate material in a highly dispersed state with a relatively easy operation. In addition, according to the present invention, it is also possible to provide a catalyst which is manufactured by such a method and which has a sufficiently enhanced catalyst activity.

DETAILED DESCRIPTION OF THE PREFERRED EMBODIMENTS

Figure 1:
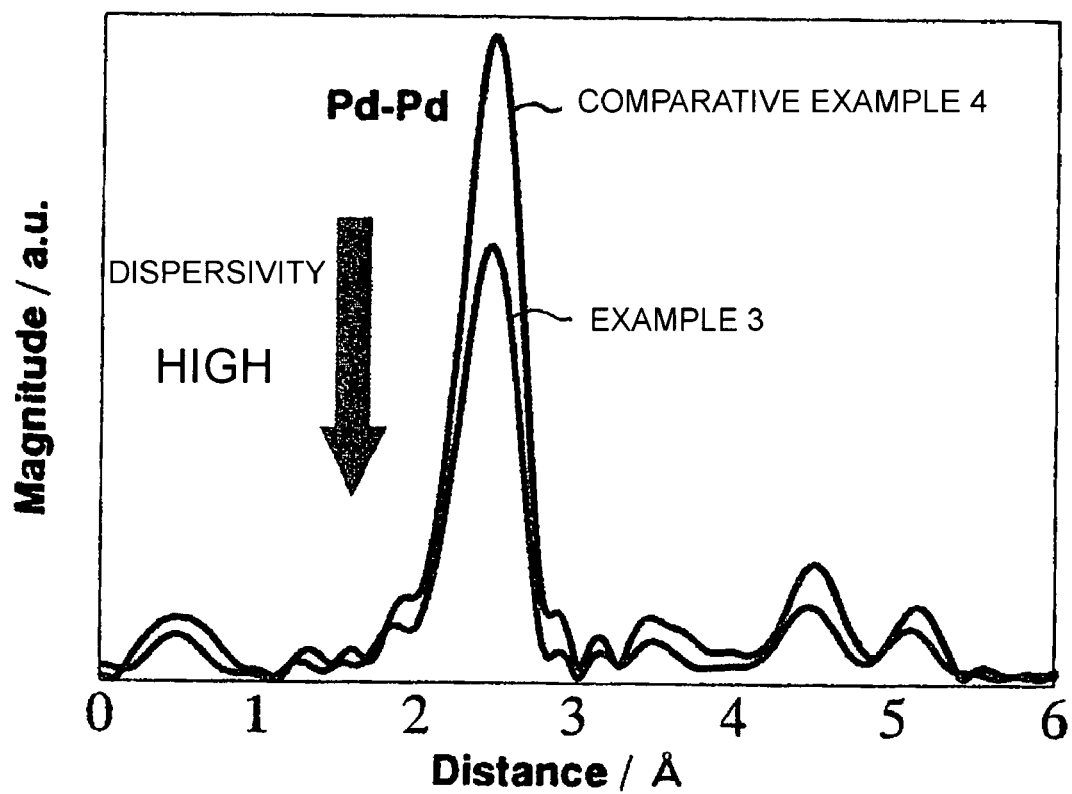
FIG. 1 is a graph showing the results of radiation light XAFS measurement for catalysts obtained in Example 3 and Comparative Example 4.

Hereafter, the present invention will be described in detail on the basis of a preferred embodiment of the invention.

To begin with, a method of manufacturing a catalyst according to the present invention will be described. The method of manufacturing a catalyst according to the present invention is a method in which a titanium-containing silicate porous material is suspended in a solution with a metal salt being dissolved therein, and then the suspended solution is exposed to ultraviolet light to precipitate metal fine particles on the surface of the porous material.

There is no particular limitation on the kind of titanium-containing silicate porous materials used in the present invention. What is preferable, however, is the one having a silica skeleton with a part of silicon atoms being substituted by titanium atoms, and what is more preferable is the one in which titanium atoms are isolated from one another and thus are highly dispersed in the silica skeleton.

Examples of such a titanium-containing silicate porous material are: materials formed by substituting, by titanium atoms, a part of silicon atoms of a mesoporous silica (MCM-41, MCM-48, MCM-50, and the like) having what is termed mesopores; materials formed by substituting, by titanium atoms, a part of aluminum atoms and/or silicon atoms of a zeolite-based material (X-type, Y-type, ZSM-5, ZSM-48, and the like); and, in particular, a microporous titanosilicalite (TS-1, TS-2, and the like) that are a titanium-silicon composite oxides, and titanium-containing mesoporous silica materials which have orderly arrayed mesopores and a hexagonal structure. Among these mentioned above, TS-1 having an MFI structure is particularly preferable from the following viewpoints. TS-1 is a material in which the substituent titanium atoms are highly dispersed in the skeleton; TS-1 has a high thermal stability; and TS-1, which has micropores, enables various selective reactions.

When the titanium content in the titanium-containing silicate porous material according to the present invention is expressed in terms of the atom ratio between Ti and Si (expressed as Ti/Si), a preferable value of Ti/Si is in a range from 0.0005 to 0.05, and a more preferable value of Ti/Si is in a range from 0.007 to 0.02. When the titanium content is less than the aforementioned lower limit, the number of titanium atoms becomes smaller for each unit surface area, and the amount of the supported metal is decreased. This results in a tendency towards a lower level of catalyst activity. When, on the other hand, the titanium content is more than the upper limit, all of the titanium atoms cannot be included in the silica skeleton, and thus some of the titanium atoms exist in the pores of the porous material in the form of titanium oxide. This lowers the dispersivity of the titanium atoms, and, as a consequence, lowers the dispersivity of the metal fine particles. What is brought about eventually is a tendency towards a lower level of catalyst activity.

In addition, among the titanium-containing silicate porous materials according to the present invention, a more preferable mesoporous material is one with fine pores, each of which has a diameter in a range from 0.5 nm to 50 nm and with a specific surface area of not smaller than 200 m²/g. What is brought about when the diameter of the fine pore is smaller than the lower limit is a tendency towards a lower level of catalyst performance in a reaction involving a large molecule. On the other hand, what is brought about when the diameter of the fine pore is larger than the upper limit is a tendency towards a smaller surface area and a lower level of the selectivity in a selective reaction using the space of the fine pores. In addition, what is brought about when the specific surface area is smaller than the lower limit is a tendency towards a decrease in the number of active sites.

There is no particular limitation on the forms of the titanium-containing silicate porous material according to the present invention. The titanium-containing silicate porous material may be in the form of powder or may be formed in various other forms. In addition, the titanium-containing silicate porous material according to the present invention may be used in a state where the titanium-containing silicate porous material is fixed to a support body that has been previously formed. Examples used as such a support body are materials made of a metal oxide with no titanium being contained or materials of various metals. Specific examples are a honeycomb support, a pellet-shaped support, and the like which are made of various ceramics (alumina, silica, magnesia, cordierite, zirconium oxide, and the like) and various metals (stainless steel and the like).

As a metal salt used in the present invention, any metal salt may be used as long as the metal salt can be dissolved in a solvent described later. An example is the salt of at least one metal selected from the group in the periodic series, which consists of elements of IA group, IIA group, IIIB group, VB group, VIB group, VIIB group, VIII group, IB group, IIB group, IVA group, VA group, and VIA group. Among these, what is preferable is a salt of a metal element showing an excellent catalyst action. Examples of a metal element showing such catalyst action are lithium, sodium, potassium, magnesium, calcium, barium, lanthanoid, vanadium, niobium, chrome, molybdenum, tungsten, manganese, rhenium, iron, ruthenium, cobalt, rhodium, iridium, nickel, palladium, platinum, copper, silver, gold, zinc, tin, lead, antimony, bismuth, selenium, tellurium, and the like. From the point of view that the metal is probably used as a catalyst material showing high activity and high selectivity in an environment purification reaction, an energy conversion reaction, and a selective oxidation reaction, what is preferable includes at least one metal selected from the group consisting of precious metals, copper, nickel, cobalt, iron, and tungsten. Among these metals, what is particularly preferable includes palladium and/or platinum.

In addition, some examples of a salt included in the metal salt according to the present invention are: a mineral acid salt, such as a nitrate salt; an organic acid salt, such as an acetate salt; and a halide, such as a chlorination product. Some examples of a solvent in which the aforementioned metal salt is dissolved are water, a mixture solvent of water and an alcohol (methanol, ethanol, and the like).

According to the present invention, the titanium-containing silicate porous material is suspended in a solution with the aforementioned metal salt being dissolved therein, and then the suspended solution is exposed to ultraviolet light to precipitate metal fine particles on the surface of the porous material. According to the present invention, above-mentioned titanium atoms are uniformly dispersed in the silica skeleton of the titanium-containing silicate porous material, so that the precipitate of the metal fine particles can be uniformly dispersed on the entire surface of the porous material. The ultraviolet light used here preferably includes a wavelength component in a range from 200 nm to 450 nm.

There is no particular limitation on the concentration of the solution in which the aforementioned metal salt is dissolved, but a preferable concentration is in a range from 0.00001 mol/l to 1 mol/l, approximately. In addition, there is also no particular limitation on the amount of the titanium-containing silicate porous material suspended in the solution, but a preferable amount is in a range from 0.1 g to 100 g, approximately.

Moreover, there is no particular limitation on the atmosphere conditions under which the exposure to the ultraviolet light is performed, and the atmosphere conditions differ in response to the properties of the used metal salt. When a metal salt that is stable to oxygen is used, the preparation of the catalyst can be performed under any one condition of the air atmosphere and the oxygen atmosphere. In contrast, when a metal salt that is unstable to oxygen is used, the oxygen contained in the water to dissolve the metal is preferably removed in a rigorous way by letting an inert gas, such as nitrogen and argon, through. What is preferable in this case is an agitation performed under the inert gas atmosphere.

Furthermore, a preferable temperature for the exposure to the ultraviolet light is in a range from 5° C. to 100° C., a more preferable temperature is in a range from 10° C. to 60° C., and a particularly preferable temperature is in a range from 15° C. to 35° C. When the temperature is below 5° C., the formation speed of the bond between titanium and the metal ion in the solution tends to become slower and the time needed for preparing the catalyst tends to become longer. In contrast, a higher temperature of the solution makes the formation speed of the bond between titanium and the metal ion in the solution faster, but at a temperature over 100° C., there tends to be no recognizable effect of the temperature on the acceleration of the formation speed of the bond. In addition, there is no particular limitation on the time for which the exposure to the ultraviolet light is performed, but a preferable time is in a range from 0.5 hours to 48 hours, approximately. Moreover, there is no particular limitation on the irradiation intensity of the ultraviolet light for the exposure, but a preferable intensity is in a range from 0.1 mW/cm$^2$ to 2 mW/cm$^2$, approximately.

The wavelength of the ultraviolet light used for the exposure in the present invention has to include a wavelength component in a range from 200 nm to 450 nm, inclusive, and preferably includes, in particular, a wavelength component in a range from 220 nm to 280 nm, inclusive. When the wavelength of the light used for the exposure is shorter than 200 nm or longer than 450 nm, the formation of the bond between titanium and the metal ion in the solution becomes more difficult.

After the precipitate of the metal fine particles are formed on the surface of the titanium-containing silicate porous material by the photo-precipitation method described thus far, the solid content is collected by, for example, centrifugal separation. Then, a drying process, a calcining process, and a hydrogen-reduction process are performed as needed. In this way, the catalyst of the present invention to be described below can be obtained. Note that the calcining process is not always necessary, and that there is no particular limitation on the conditions for the processing. Preferable conditions for the calcining process, however, are in an air atmosphere, a temperature in a range from 100° C. to 800° C., and a duration time in a range from 0.5 hours to 48 hours, approximately. In addition, the hydrogen-reduction process is not always necessary, either. There is also no particular limitation on the conditions for the processing. Preferable conditions for the hydrogen-reduction process, however, are in a hydrogen atmosphere, a temperature in a range from 100° C. to 500° C., and a duration time in a range from 0.5 hours to 24 hours, approximately.

The catalyst manufactured by the above method of the present invention includes the aforementioned titanium-containing silicate porous material and the aforementioned metal fine particles precipitated on the surface of the porous material. In the catalyst of the present invention, the metal fine particles are highly dispersed and supported on the surface of the porous material, so that the catalyst of the present invention shows a higher catalyst activity than a catalyst prepared by a conventional impregnation method.

In the catalyst of the present invention, there is no particular limitation on the amount of the metal fine particles supported by the aforementioned titanium-containing silicate porous material, but a preferable amount is in a range from 0.01 wt % to 5 wt %, approximately. A supported amount that is smaller than the lower limit tends to make the number of catalyst active sites smaller and to decrease the catalyst activity. In contrast, a supported amount that exceeds the upper limit tends to cause the agglomeration of the metal species and thus the particles of the catalyst become too large. This results in a tendency towards a lower level of the catalyst activity.

In addition, there is no particular limitation on the particle size of each metal fine particle supported by the aforementioned titanium-containing silicate porous material in the catalyst of the present invention, but a preferable average particle size is in a range from 5 Å to 100 Å, approximately. An average particle size below the lower limit tends to make the number of catalyst active sites smaller and to decrease the catalyst activity because the metal species are buried in the support and for other reasons. In contrast, an average particle size exceeding the upper limit tends to form the agglomeration of the metal species and thus to make the particle size of the metal particle too large. This results in a decrease in the catalyst activity.

Such a catalyst of the present invention can be used in every known reaction by selecting the metal element appropriately so as to correspond to the target reaction. For example, the catalyst of the present invention containing palladium, nickel, or platinum shows a high activity in such reactions as a hydrogenation reaction, a dehydrogenation reaction, an oxidation reaction, and the like. In addition, the catalyst of the present invention containing cobalt or rhodium shows a high activity in such reactions as a hydroformylation reaction, a hydroesterification reaction, and the like.

EXAMPLES

Hereafter, the present invention will be described more specifically on the basis of Examples and Comparative Examples, but the following Examples are not the only ways of carrying out the present invention.

Synthesis of Titanium-Containing Mesoporous Silica

Tetraethoxysilane of 30 g as a silica source, titanium tetraisopropoxide of 0.4 g as a titanium source, dodecylamine of 7.0 g as a structural control agent, isopropyl alcohol of 8.5 g, ethanol of 42.5 g, hydrochloric acid (concentration: 36 wt % HCl) of 0.3 g and distilled water of 92 ml were agitated and mixed under such conditions as in the air atmosphere, at 25° C., and for 24 hours. The solid content thus obtained was filtrated, washed and then calcined under such conditions as in the air atmosphere, at 550° C. and for 5 hours. In this way, a titanium-containing mesoporous silica was synthesized.

The mesoporous silica thus obtained had a silica skeleton with a part of silicon atoms being substituted by titanium atoms. The obtained mesoporous silica had a ratio of titanium atoms to silicon atoms (atom ratio) (Ti/Si)=0.01, an average diameter of the fine pores of 6.0 nm, and a specific surface area of 1000 $m^2/g$. The obtained mesoporous silica was a titanium-containing mesoporous silica having orderly-arrayed mesopores and a hexagonal structure (thus obtained was what is termed Ti-HMS).

Example 1

According to the photo-precipitation method of the present invention, a platinum-supporting titanium-containing mesoporous silica catalyst was obtained in the following way. Firstly, the aforementioned titanium-containing mesoporous silica of 0.40 g, distilled water of 30 ml, and hexachloroplatinic acid hexahydrate of 0.0106 g were put in a test tube. The resultant mixture was agitated in the air atmosphere at the room temperature for 24 hours while being exposed to the light from a mercury lamp (wavelength in a range from 200 nm to 450 nm) with an irradiation intensity of 1.5 $mW/cm^2$. The solid content was collected by centrifugal separation, and was then dried at 105° C. After that, the solid content was calcined in the air atmosphere at 450° C. for 5 hours, and then was subjected to a hydrogen-reduction process at 200° C. for 2 hours.

An X-ray diffraction measurement was carried out on the obtained platinum-supporting titanium-containing mesoporous silica catalyst, and only a peak that is unique to titanium-containing mesoporous silicas was observed in the measurement result. Such a measurement result demonstrates the retention of a mesoporous structure. In addition, an X-ray fluorescence analysis was carried out and the analysis result reveals that the amount of supported platinum was 0.39 wt %. Moreover, a TEM observation and a radiation light XAFS measurement were carried out, and the results reveal that a peak attributable to platinum metal was recognized and that platinum ultrafine particles with an average diameter of approximately 5 nm were highly dispersed on the surface of the catalyst.

Comparative Example 1

According to what is termed an impregnation method, a platinum-supporting titanium-containing mesoporous silica catalyst was obtained for the comparative purpose in the following way. Firstly, the titanium-containing mesoporous silica of 0.40 g, distilled water of 30 ml, and hexachloroplatinic acid hexahydrate of 0.0106 g were put in a test tube. The resultant mixture was agitated in the air atmosphere at the room temperature for 24 hours. Then, the distilled water is distilled away with an evaporator, and the solid content thus obtained was dried at 105° C. After that, the solid content was calcined in the air atmosphere at 450° C. for 5 hours, and then was subjected to a hydrogen-reduction process at 200° C. for 2 hours.

An X-ray fluorescence analysis was carried out on the obtained platinum-supporting titanium-containing mesoporous silica catalyst and the analysis result reveals that the amount of supported platinum was 0.81 wt %. Moreover, a TEM observation and a radiation light XAFS measurement were carried out, and the results reveal that platinum fine particles that were supported in the fine pores had an average diameter of approximately 20 nm.

<$NO_x$-Decomposition Reaction Test>

$NO_x$-decomposition tests were carried out in the following way by use of the catalysts obtained in Example 1 and Comparative Example 1. A stainless-steel flow reactor was used, and each catalyst of 100 mg was filled in a reaction tube. While a mixture gas in which nitrogen monoxide and oxygen were diluted with helium, so as to have a concentration of nitrogen monoxide of 400 ppm, and that of oxygen of 5%, respectively, was made to flow at a flow rate of 30 ml/min, a reaction test was carried out under a temperature condition of 300° C. An $NO_x$ meter was installed at the outlet of the reaction tube of the flow reactor, and thus the decomposition rate was obtained from the amount of $NO_x$ contained in the mixture gas after the reaction. In the case of using the catalyst obtained in Example 1, nitrogen oxide of 284 ppm was contained in the mixture gas after the reaction and, therefore, nitrogen oxide of 116 ppm was decomposed. Accordingly, the decomposition ability for every milligram of the supported platinum in the case of using the catalyst obtained in Example 1 was 297 ppm.

On the other hand, in the case of using the catalyst obtained in Comparative Example 1, nitrogen oxide of 280 ppm was contained in the mixture gas after the reaction and, therefore, nitrogen oxide of 120 ppm was decomposed. Accordingly, the decomposition ability for every milligram of the supported platinum in the case of using the catalyst obtained in Comparative Example 1 was 148 ppm.

Example 2

According to the photo-precipitation method of the present invention, a palladium-supporting titanium-containing mesoporous silica catalyst was obtained in the following way. Firstly, the aforementioned titanium-containing mesoporous silica of 1.0 g, distilled water of 30 ml, and palladium chloride of 0.047 g were put in a test tube. The resultant mixture was agitated in the air atmosphere at the room temperature for 24 hours while being exposed to the light from a mercury lamp (wavelength in a range from 200 nm to 450 nm) with an irradiation intensity of 1.5 mW/cm$^2$. The solid content was collected by centrifugal separation, and was then dried at 105° C. After that, the solid content was calcined in the air atmosphere at 450° C. for 5 hours, and then was subjected to a hydrogen-reduction process at 200° C. for 2 hours.

An X-ray diffraction measurement was carried out on the obtained palladium-supporting titanium-containing mesoporous silica catalyst, and only a peak that is unique to titanium-containing mesoporous silicas was observed in the measurement result. Such a measurement result demonstrates the retention of a mesoporous structure. In addition, an X-ray fluorescence analysis was carried out and the analysis result reveals that the amount of supported palladium was 1.5 wt %. Moreover, a TEM observation and a radiation light XAFS measurement were carried out, and the results reveal that a peak attributable to palladium metal was recognized and that palladium ultrafine particles with an average diameter of approximately 5 nm were highly dispersed on the surface of the catalyst.

Comparative Example 2

According to what is termed an equilibrium adsorption method, a palladium-supporting titanium-containing mesoporous silica catalyst was obtained for the comparative purpose in the following way. Firstly, the aforementioned titanium-containing mesoporous silica of 1.0 g, distilled water of 30 ml, and palladium chloride of 0.047 g were put in a test tube. The resultant mixture was agitated in the air atmosphere at the room temperature for 24 hours while being exposed to the light from a fluorescent lamp (wavelength in a range from 370 nm to 780 nm) with an irradiation intensity of 1.0 mW/cm$^2$ through a short-wavelength cutting filter that cuts off short wavelength of not longer than 450 nm. The solid content was collected by centrifugal separation, and was then dried at 105° C. After that, the solid content was calcined in the air atmosphere at 450° C. for 5 hours, and then was subjected to a hydrogen-reduction process at 200° C. for 2 hours.

An X-ray fluorescence analysis was carried out on the obtained palladium-supporting titanium-containing mesoporous silica catalyst and the analysis result reveals that the amount of supported palladium was not more than 0.01 wt %. Note that, in Comparative Example 1, the amount of the supported platinum was 0.81 wt % because the platinum-supporting titanium-containing mesoporous silica catalyst was obtained by an impregnation method with an accompanying concentration procedure. By contrast, in Comparative Example 2, the amount of the supported palladium was not more than 0.01 wt % because the palladium-supporting titanium-containing mesoporous silica catalyst was obtained by an equilibrium adsorption method with no accompanying concentration procedure. When the platinum-supported titanium-containing mesoporous silica catalyst is obtained by an equilibrium adsorption method with no accompanying concentration procedure as in the latter case, the amount of the supported platinum becomes not more than 0.01 wt %.

<Hydrogen Peroxide Production Test 1>

Hydrogen peroxide production test 1 was carried out in the following way by use of the catalysts obtained in Example 2 and Comparative Example 2. Each catalyst of 0.1 g and 0.01-normal hydrochloric acid of 50 ml were put in a glass reactor vessel. While the resultant mixture was agitated at the room temperature, hydrogen and oxygen were supplied to the reactor vessel at their respective flow rates of 50 ml/min and 50 ml/min. After 2-hour reaction, the supernatant of the reaction liquid was skimmed and an aqueous solution of potassium permanganate was dripped down to the skimmed supernatant. In the case of using the catalyst obtained in Example 2, the purple resultant supernatant turned transparent. This demonstrates that hydrogen peroxide was produced.

By contrast, in the case of using the catalyst obtained in Comparative Example 2, the purple color did not change. This demonstrates that no hydrogen peroxide was produced.

Example 3

According to the photo-precipitation method of the present invention, a palladium-supporting titanium-containing mesoporous silica catalyst was obtained in the following way. Firstly, the titanium-containing mesoporous silica of 1.0 g, distilled water of 30 ml, and palladium chloride of 0.045 g were put in a test tube. The resultant mixture was agitated in the air atmosphere at the room temperature for 24 hours while being exposed to the light from a mercury lamp (wavelength in a range from 200 nm to 450 nm) with an irradiation intensity of 1.5 mW/cm$^2$. The solid content was collected by centrifugal separation, and was then dried at 100° C. for 12 hours. After that, the solid content was calcined in the air atmosphere at 450° C. for 8 hours, and then was subjected to a hydrogen-reduction process at 200° C. for 1 hour.

An X-ray diffraction measurement was carried out on the obtained palladium-supporting titanium-containing mesoporous silica catalyst, and only a peak that is unique to titanium-containing mesoporous silicas was observed in the measurement result. Such a measurement result demonstrates the retention of a mesoporous structure. In addition, an X-ray fluorescence analysis was carried out and the analysis result reveals that the amount of supported palladium was 1.4 wt %.

Comparative Example 3

According to what is termed an impregnation method, a palladium-supporting titanium-containing mesoporous silica catalyst was obtained for the comparative purpose in the following way. Firstly, the aforementioned titanium-containing mesoporous silica of 0.40 g, distilled water of 30 ml, and palladium chloride of 0.0060 g were put in a test tube. The resultant mixture was agitated in the air atmosphere at the room temperature for 24 hours. Then, the distilled water is distilled away with an evaporator, and the solid content thus obtained was dried at 100° C. for 12 hours. After that, the solid content was calcined in the air atmosphere at 450° C. for 8 hours, and then was subjected to a hydrogen-reduction process at 200° C. for 1 hour.

An X-ray fluorescence analysis was carried out on the obtained palladium-supporting titanium-containing mesoporous silica catalyst and the analysis result reveals that the amount of supported palladium was 0.9 wt %.

Comparative Example 4

A palladium-supporting titanium-containing mesoporous silica catalyst was obtained for the comparative purpose in a similar way to the one in Comparative Example 3 except that the amount of palladium chloride was 0.010 g. An X-ray fluorescence analysis was carried out on the obtained palladium-supporting titanium-containing mesoporous silica catalyst and the analysis result reveals that the amount of supported palladium was 1.4 wt %.

<Dispersivity Qualification Test>

A radiation light XAFS measurement was carried out by use of the catalysts obtained in Example 3 and Comparative Example 4. The results thus obtained were shown in FIG. 1. As the results shown in FIG. 1 clearly demonstrate that the dispersivity of the palladium metal in the catalyst obtained by the photo-precipitation method of the present invention in Example 3 was improved in comparison to that in the catalyst obtained by the impregnation method in Comparative Example 4.

<Hydrogen Peroxide Production Test 2>

Figure 2:
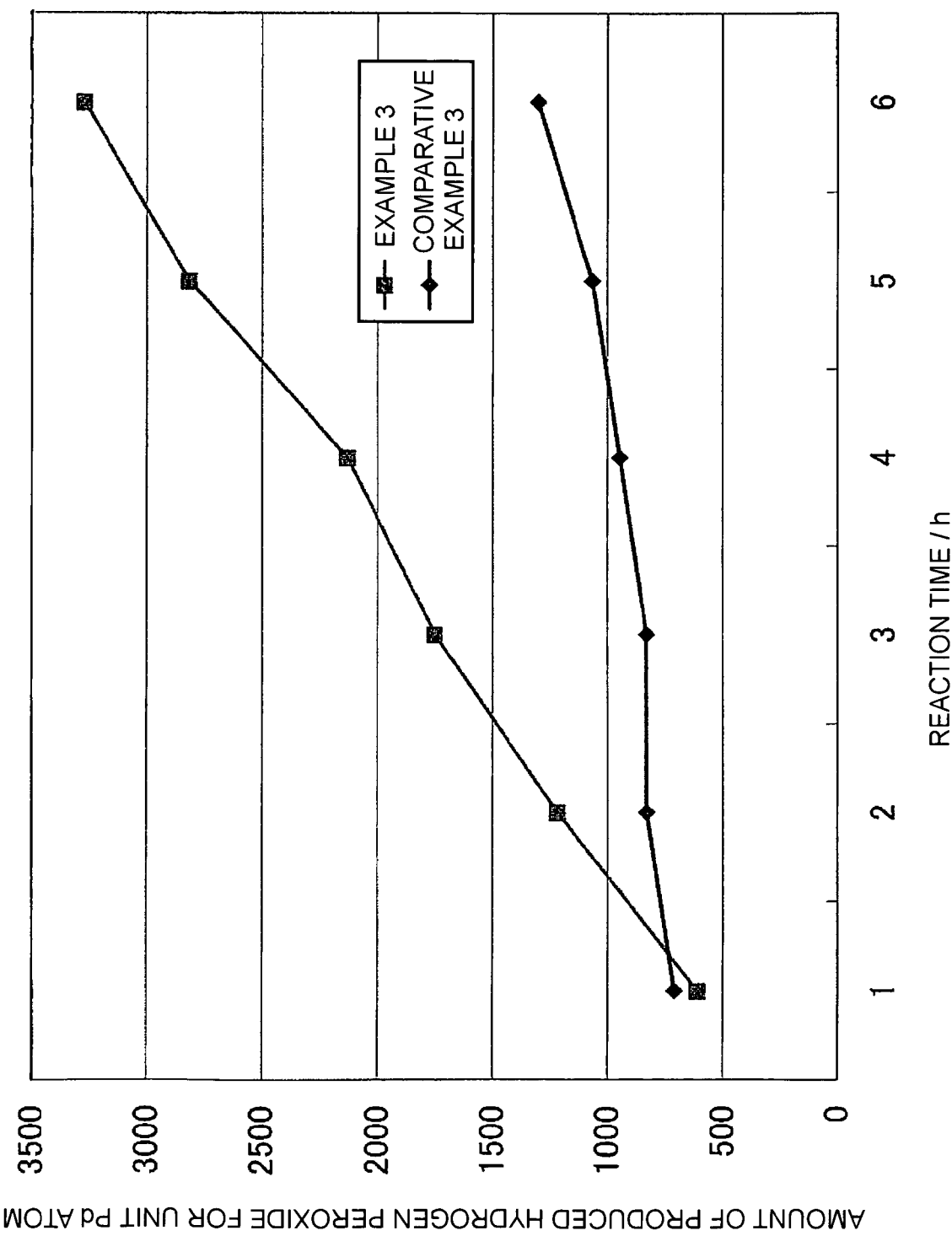
FIG. 2 is a graph showing the results of a hydrogen peroxide production test by use of catalysts obtained in Example 3 and Comparative Example 3.

Hydrogen peroxide production test 2 was carried out in the following way by use of the catalysts obtained in Example 3 and Comparative Example 3. Each catalyst of 0.1 g and 0.01-normal hydrochloric acid of 50 ml were put in a glass reactor vessel. While the resultant mixture was agitated at the room temperature, hydrogen and oxygen were supplied to the reactor vessel at their respective flow rates of 40 ml/min and 40 ml/min. The supernatant of the reaction liquid was skimmed for each hour until 6 hours had been passed from the start of the reaction. An oxidation-reduction titration was carried out by use of an aqueous solution of potassium permanganate to obtain the amount of produced hydrogen peroxide for each unit of palladium atom (unit: $H_2O_2$-mol/Pd-mol). The results thus obtained are shown in FIG. 2. The results shown in FIG. 2 clearly demonstrate that the efficiency in the hydrogen-peroxide production for the catalyst obtained by the photo-precipitation method of the present invention in Example 3 was improved in comparison to that for the catalyst obtained by the impregnation method in Comparative Example 3.

<Phenol Oxidation Reaction Test>

A phenol oxidation reaction test was carried out in the following way by use of the catalysts obtained in Example 3 and Comparative Example 4. Each catalyst of 0.1 g, 0.01-normal hydrochloric acid of 10 ml, methanol of 10 ml and phenol of 1.0 g were put in a glass reactor vessel. While the resultant mixture was agitated at 70° C., hydrogen and oxygen were supplied to the reactor vessel at their respective flow rates of 40 ml/min and 40 ml/min. The amounts of p-hydroquinone (HQ), of benzoquinone (BQ), and of catechol (CAT), produced in the reaction solution at 12 hours after the start of the reaction, were obtained. The proportions of these were as follows.

|  | HQ (%) | EQ (%) | CAT (%) |
|---|---|---|---|
| Example 3 | 13 | 14 | 73 |
| Comparative Example 4 | 4 | 7 | 89 |

The above results demonstrate that the phenol oxidation reaction was progressed in a state where p-selectivity (HQ+BQ) was relatively high in the case of the catalyst obtained by the photo-precipitation method of the present invention in Example 3 in comparison to the case of the catalyst obtained by the impregnation method in Comparative Example 4.

Example 4

According to the photo-precipitation method of the present invention, a nickel-supporting titanium-containing mesoporous silica catalyst was obtained in the following way. Firstly, the aforementioned titanium-containing mesoporous silica of 1.0 g, distilled water of 30 ml, and nickel nitrate (hexahydrate) of 0.050 g were put in a test tube. The resultant mixture was agitated in the air atmosphere at the room temperature for 24 hours while being exposed to the light from a mercury lamp (wavelength in a range from 200 nm to 450 nm) with an irradiation intensity of 1.5 mW/cm². The solid content was collected by centrifugal separation, and was then dried at 105° C. After that, the solid content was calcined in the air atmosphere at 450° C. for 5 hours, and then was subjected to a hydrogen-reduction process at 200° C. for 2 hours.

An X-ray diffraction measurement was carried out on the obtained nickel-supporting titanium-containing mesoporous silica catalyst, and only a peak that is unique to titanium-containing mesoporous silicas was observed in the measurement result. Such a measurement result demonstrates the retention of a mesoporous structure. In addition, an X-ray fluorescence analysis was carried out, and the analysis result reveals that the amount of supported nickel was 0.92 wt %. Moreover, a TEM observation and a radiation light XAFS measurement were carried out, and the results reveal that a peak attributable to nickel metal was recognized and that nickel ultrafine particles with an average diameter of approximately 5 nm were highly dispersed on the surface of the catalyst.

Comparative Example 5

According to what is termed an equilibrium adsorption method, a nickel-supporting titanium-containing mesoporous silica catalyst was obtained for the comparative purpose in the following way. Firstly, the aforementioned titanium-containing mesoporous silica of 1.0 g, distilled water of 30 ml, and nickel nitrate (hexahydrate) of 0.050 g were put in a test tube. The resultant mixture was agitated in the air atmosphere at the room temperature for 24 hours while being exposed to the light from a fluorescent lamp (wavelength in a range from 370 nm to 780 nm) with an irradiation intensity of 1.0 mW/cm² through a short-wavelength cutting filter that cuts off short wavelength of not longer than 450 nm. The solid content was collected by centrifugal separation, and was then dried at 105° C. After that, the solid content was calcined in the air atmosphere at 450° C. for 5 hours, and then was subjected to a hydrogen-reduction process at 200° C. for 2 hours.

An X-ray fluorescence analysis was carried out on the obtained nickel-supporting titanium-containing mesoporous silica catalyst and the analysis result reveals that the amount of supported nickel was not more than 0.01 wt %.

INDUSTRIAL APPLICABILITY

As has been described thus far, according to the present invention, it is possible to provide a method of manufacturing a catalyst that has a sufficiently enhanced catalyst activity, with which method, metal fine particles can be made to be supported on the surface of a titanium-containing silicate porous material in a highly dispersed state with a relatively easy operation. Accordingly, in the catalyst obtained by the manufacturing method of the present invention, the metal fine particles are supported on the surface of the titanium-containing silicate porous material in a highly dispersed state, so that the catalyst activity can be enhanced sufficiently.

Accordingly, the present invention is very useful as a technique to obtain oxidation catalysts to synthesize various chemical products, catalysts for purification of exhaust gas, catalysts for purification of air, catalysts for purification of water, and the like.

The invention claimed is:

1. A method of manufacturing a catalyst wherein a titanium-containing silicate porous material having a silica skeleton in which a portion of the silica atoms are substituted by titanium atoms that are dispersed in said silica skeleton is suspended in a solution with a metal salt being dissolved therein, and then the suspended solution is exposed to ultraviolet light to precipitate metal fine particles on the surface of the porous material, wherein said titanium-containing silicate porous material is a titanium-containing mesoporous silica material which has orderly-arrayed mesopores and a hexagonal structure, and said metal salt is a salt of at least one metal selected from the group consisting of precious metals, copper, nickel, cobalt, iron and tungsten.

2. The method of manufacturing a catalyst according to claim 1, wherein the ultraviolet light includes a wavelength component in a range of from 200 nm to 450 nm.

3. The method of manufacturing a catalyst according to claim 1, wherein the metal is palladium and/or platinum.

4. The method of manufacturing a catalyst according to claim 1, wherein the titanium-containing silicate porous material has a diameter in a range of from 0.5 nm to 50 nm and with a specific surface area of not smaller than 200 $m^2/g$.

5. The method of manufacturing a catalyst according to claim 1, wherein the titanium-containing silicate porous material has an MFI structure.

6. The method of manufacturing a catalyst according to claim 1, wherein the titanium content in the titanium-containing silicate porous material which is expressed in terms of an atom ratio between Ti and Si, a value of Ti/Si, is in a range of from 0.0005 to 0.05 as the value of Ti/Si.

7. The method of manufacturing a catalyst according to claim 1, wherein an amount of the metal fine particles supported by the titanium-containing silicate porous material is in a range of from 0.01 wt % to 5 wt %, and an average particle size of each metal fine particle is in a range from 5 Å to 100 Å.

* * * * *